(12) United States Patent
Bonnet (10) Patent No.: US 7,828,523 B2
(45) Date of Patent: Nov. 9, 2010

(54) ROTOR BLADE FOR A WIND TURBINE HAVING A VARIABLE DIMENSION

(75) Inventor: Laurent Bonnet, Mesum (DE)

(73) Assignee: General Electric Company, Schenectady, NY (US)

( * ) Notice: Subject to any disclaimer, the term of this patent is extended or adjusted under 35 U.S.C. 154(b) by 800 days.

(21) Appl. No.: 11/691,587

(22) Filed: Mar. 27, 2007

(65) Prior Publication Data

US 2008/0240923 A1    Oct. 2, 2008

(51) Int. Cl.
   *F03D 7/00*       (2006.01)
(52) U.S. Cl. ............... 416/1; 416/24; 416/37; 416/61; 416/66; 416/132 B
(58) Field of Classification Search ....... 416/1, 416/23, 24, 37, 47, 61, 66, 82, 87, 88, 132 R, 416/132 B, 223 R, 225
   See application file for complete search history.

(56) References Cited

U.S. PATENT DOCUMENTS

| | | | | |
|---|---|---|---|---|
| 2,135,887 A | * | 11/1938 | Fairey | ............... 416/23 |
| 3,814,351 A | * | 6/1974 | Bielawa | ............... 244/17.19 |
| 4,180,372 A | * | 12/1979 | Lippert, Jr. | ............... 416/23 |
| 4,563,970 A | * | 1/1986 | Walker | ............... 244/215 |
| 4,710,101 A | * | 12/1987 | Jamieson | ............... 416/32 |
| 6,139,268 A | * | 10/2000 | Murawski et al. | ............... 416/23 |
| 6,902,370 B2 | * | 6/2005 | Dawson et al. | ............... 415/4.1 |
| 6,984,110 B2 | * | 1/2006 | Jang | ............... 416/23 |
| 2006/0033338 A1 | * | 2/2006 | Wilson | ............... 290/44 |

* cited by examiner

*Primary Examiner*—Igor Kershteyn
(74) *Attorney, Agent, or Firm*—Global Patent Operation; Douglas D. Zhang (57) ABSTRACT

A rotor blade 1 includes a main blade section 10, and an extension flap 20. The extension flap 20 is moveable relative to the main blade section 10. At least the main blade section 10 and the extension flap 20 form an airfoil lifting surface of the blade. A dimension of the airfoil lifting surface is variable by moving the extension flap 20 relative to the main blade section 10.

22 Claims, 4 Drawing Sheets

ROTOR BLADE FOR A WIND TURBINE HAVING A VARIABLE DIMENSION

BACKGROUND OF THE INVENTION

The present invention relates to a rotor blade for a wind turbine, in particular to a rotor blade having a variable dimension. It further relates to a wind turbine comprising the rotor blade, and to a method of controlling a wind turbine.

Wind turbines are commonly used to convert kinetic energy of an air stream into electric energy. An essential part of a wind turbine is the rotor with rotor blades, which captures the kinetic energy and converts it into rotational energy. Under normal wind conditions, it is generally desired to maximize the energy conversion efficiency. The efficiency of uptake of kinetic energy mainly depends on the aerodynamic profile and the pitch angle of the rotor blades. In order to adjust the pitch angle, the rotor blades can be rotated around their longitudinal axis by using a pitch drive. High-wind areas being limited, it is desired to use wind energy also under generally lower wind conditions. In order to extract sufficient wind energy under these conditions, it is desired to have a large blade size.

At very high wind speeds or gusts, however, the power captured from the wind by the rotor may exceed the limits set by the wind turbine's structural strength, especially for large blade sizes. Additionally, the generator's allowable maximum power constitutes a limit for the rotor's output power. Further, varying wind speed leads to a non-uniform rotation of the rotor and thereby creating additional non-uniform load. It is therefore a desire to reduce extreme loads at high wind speeds.

There is therefore a need for a rotor blade that can be flexibly adapted to various wind conditions.

BRIEF DESCRIPTION OF THE INVENTION

According to a first aspect of the invention, a rotor blade comprises a main blade section and an extension flap. The extension flap is translationally moveable relative to the main blade section. At least the main blade section and the extension flap form an airfoil lifting surface of the blade. A dimension of the airfoil lifting surface, e.g. the chord length, is variable by translationally moving the extension flap relative to the main blade section. A translational movement is a movement, after which substantially all parts of the extension flap have changed position in a similar direction. The translational movement does not need to be a pure translational movement, and additional kinds of movement, such as a rotational movement may be superimposed.

According to a second aspect of the invention, a rotor blade comprises a main blade section, and an extension flap. The main blade section and the extension flap define an airfoil having a leading edge and a trailing edge, and a distance between the leading edge and a trailing edge defines a chord length of the rotor blade. The extension flap is slidable relative to the main blade section for varying the chord length.

According to a third aspect of the invention, a method of controlling a wind turbine is provided. The wind turbine comprises a rotor blade comprising a main blade section and an extension flap. The method comprises the following steps: collecting wind data or data pertaining to the rotor motion; translationally moving, in response to the collected data, the extension flap relative to the main blade section, thereby varying a dimension of the airfoil lifting surface of the rotor blade in response to the collected wind data.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
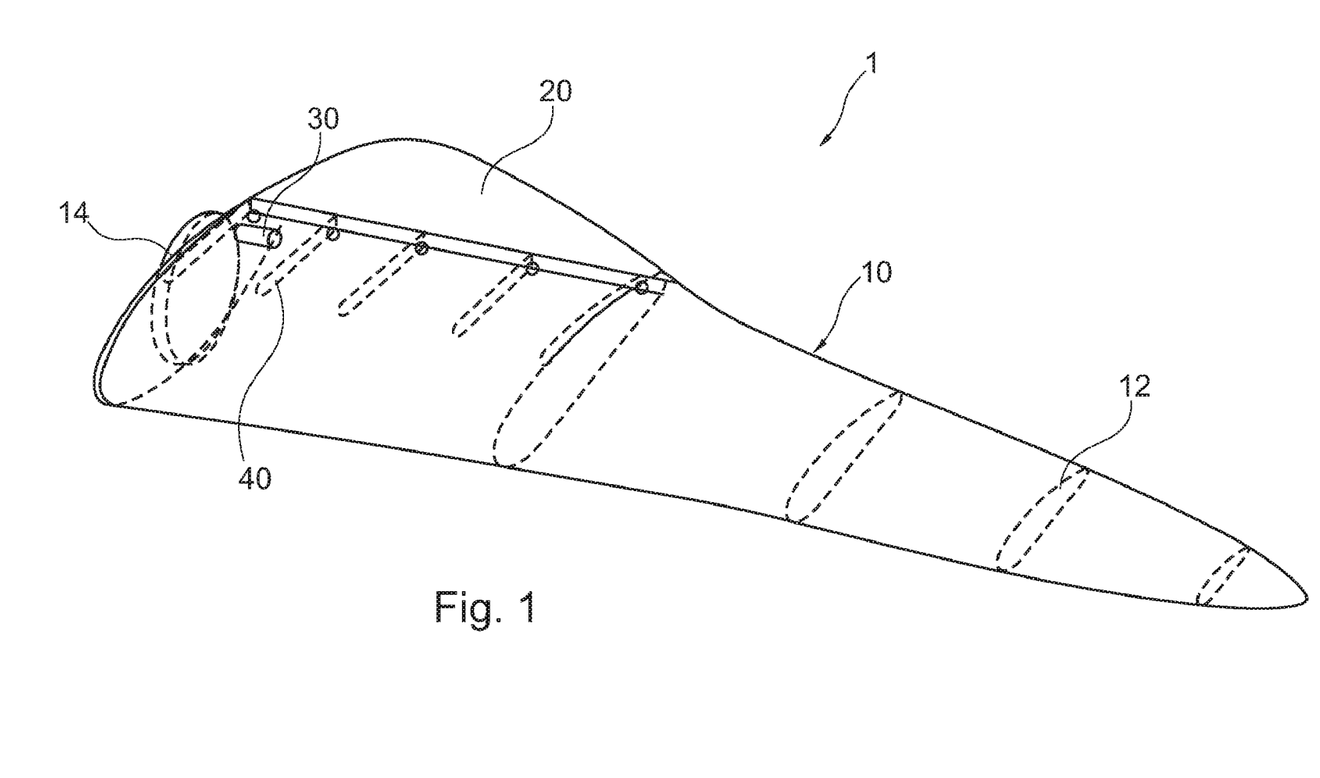
FIG. 1 shows a perspective view of a rotor blade being a first embodiment of the invention.

FIG. 1 shows a perspective view of a rotor blade 1. The rotor blade 1 comprises a main blade section 10 having at its root side a coupling mechanism 14 for coupling the blade 1 to a rotor of the wind turbine. The main blade section 10 is further provided with a distributed shear web 12 construction. The shear webs 12 permit a light-weight yet high strength construction.

The rotor blade 1 further comprises an extension flap 20, which is provided at a trailing edge side of the main blade section 10. The extension flap 20 is translationally slidable relative to the main blade section 10 along a chord direction of the rotor blade 1. The rotor blade 1 further comprises a driving mechanism 30 for driving the sliding motion of the extension flap 20. The rotor blade 1 further comprises a guide system 40 having a plurality of sliding guides, and an actuating system 30 having a plurality of actuators. The actuating system 30 and the guiding system 40 allow the extension flap 20 to be slid between a retracted position (shown e.g. in FIG. 3 below) and a deployed position (as shown in FIG. 1). More specifically, the extension flap 20 is partially or fully retractable to a position inside the main blade section 10. Thereby, the chord length (which is defined by the distance between the leading edge and a trailing edge of the rotor blade 1) and thus the airfoil surface area of the rotor blade 1 can be varied. The main blade section 10 has a slot opening, through which the extension flap 20 can be slid. The slot opening on the trailing edge is provided with a seal.

The blade of FIG. 1 allows increasing the airfoil area by moving the extension flap to the deployed position. Due to the increased airfoil area and, hence, lifting area, the energy conversion can be increased, in particular at low wind speeds. Further, the rotor can be operated at lower rotational speed for a given power class. Thereby, lower overall acoustic emissions can be achieved.

At high wind speeds or at extreme loads, e.g. gusts, the airfoil area can be reduced by moving the extension flap to the retracted position. Due to the reduced airfoil area, drag and generally extreme dynamic loads can be reduced. Thus, a blade can be provided that allows capturing wind energy efficiently at low wind speed (e.g. as low as 3 m/s) and that allows, at the same time, reducing dynamic loads, especially at high wind speeds or at stand-still of the rotor. This is accomplished using a variable blade geometry.

In FIG. 1, the extension flap is located at the root of the blade and not exceeding ⅓ or even ½ of the blade length inboard. This it is the region of the lowest relative flow velocity and therefore of lowest contributor to overall acoustic noise. In this embodiment, the contribution of the extension flap 20 to overall noise is expected to be minor.

Figure 2:
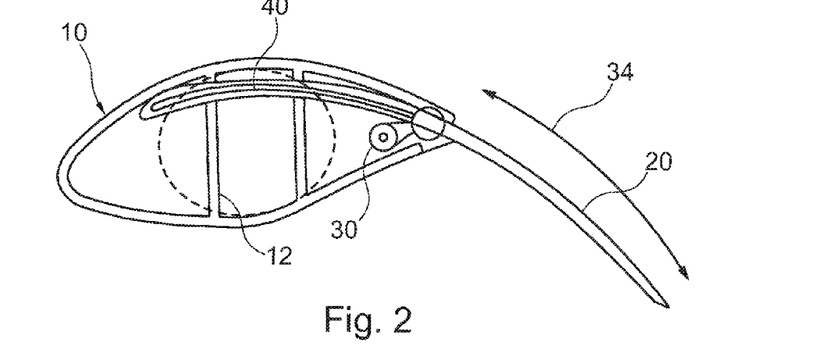
FIG. 2 shows a cross-sectional side view of the rotor blade being a first embodiment of the invention.

FIG. 2 shows a cross-sectional side view of the rotor blade of FIG. 1, with like reference numbers indicating like parts as in FIG. 1. The extension flap 20 is, again, shown in the deployed position. Arrows 34 indicate the possible translational motion of the extension flap 20.

The extension flap 20 has a constant thickness of about 20 to 50 mm, and is constructed using e.g. an FGRP sandwich with a balsa or honeycomb core structure. The curvature of the extension flap 20 matches approximately the curvature of the upper surface (suction side) of the main blade section 10. More precisely, its high camber approximately matches the aft curvature of the pressure side airfoil of the main section. Thereby, the extension flap is provided parallel to and close to the corresponding surface of the main blade 10. Alternatively, the curvature of the extension flap may match approximately the curvature of the lower surface (pressure side) of the main blade section 10. By adapting the curvature of the extension flap, a desired aerodynamic profile can be achieved for the deployed extension flap. Further, drag can be reduced. Consequently, the required actuation force for moving the extension flap 20 can be reduced.

FIG. 2 further shows the actuator 30 and the guide system 40 in more detail. The guide system 40 is a railing sliding guide system. The extension flap 20 has an internal part, i.e. a part that is inside the main blade section even in the deployed position for carrying lift and related moment and aerodynamic load to the guiding system 40. The guide system 40 intersects with and is attached to at least some of the shear webs 12. The shear webs 12 are provided with slots at the intersection with the sliding guides, which allow the extension flap to pass through the shear webs 12. This construction allows the guide system 40 to carry the aerodynamic load to the shear webs 12. Thus, the shear webs 12 are, thus, used to handle not only loads due to the main blade section, but also loads due to the extension flap.

In embodiments, the guiding system 40 comprises at least two aluminum or steel race guiders. The race guiders are arranged in parallel to each other along the chord (see FIG. 1). It further comprises at least two bearing rollers. The guiders can be integrated into composite panels normal to the pressure side wall camber in order to increase the strength against moment loading from the extension flap and greater resistance to local buckling.

Figure 5:
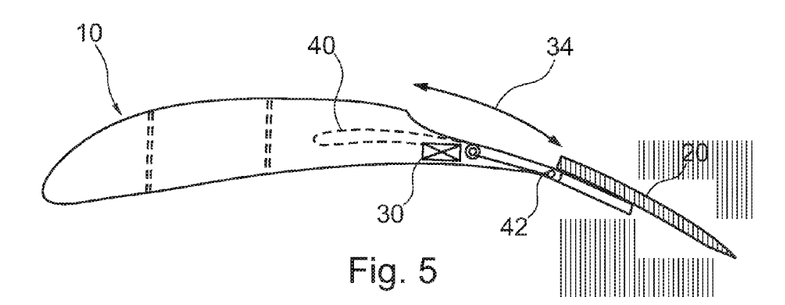
FIG. 5 shows a cross-sectional side view of a rotor blade being a second embodiment of the invention.

Alternatively or in addition, the extension flap can be mounted on telescopic guiders as shown in FIG. 5. Further, the extension flap may have an open slot in between the main blade section 10 and the extension flap 20 for achieving a desired pressure distribution and for increasing the stall margin.

The actuator 30 for the translational motion of the extension flap is schematically drawn as an electrical motor, but may be realized using any driving mechanism known in the art, e.g. by a pre-tensioned spring, by a hydraulic or pneumatic drive, and/or by any other driving mechanism. Actuation may, alternatively, be omitted.

The actuator 30 is coupled to the guiding system 40 and/or to the extension flap 20 by a gear. The gear may be a rack-and-pinion gear. Multiple actuators and/or gears can be provided, each coupled to a corresponding gear track, so that a deploying or retracting force is distributed uniformly along the extension flap length. Alternatively a push-pull trim wire system on pulleys can be provided.

Figure 6:
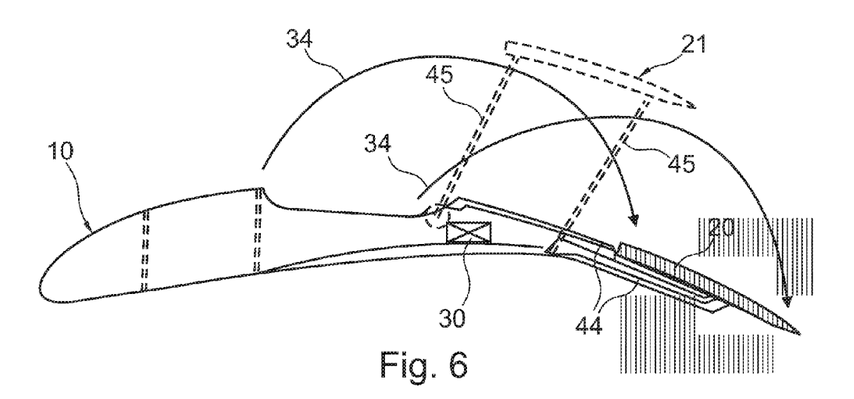
FIG. 6 shows a cross-sectional side view of the rotor blade being a third embodiment of the invention.

The present embodiment could be modified such that the retracted position of the extension flap 20 is outside the main blade section 10, as is the case in the embodiments of FIGS. 5 and 6.

Figure 3:
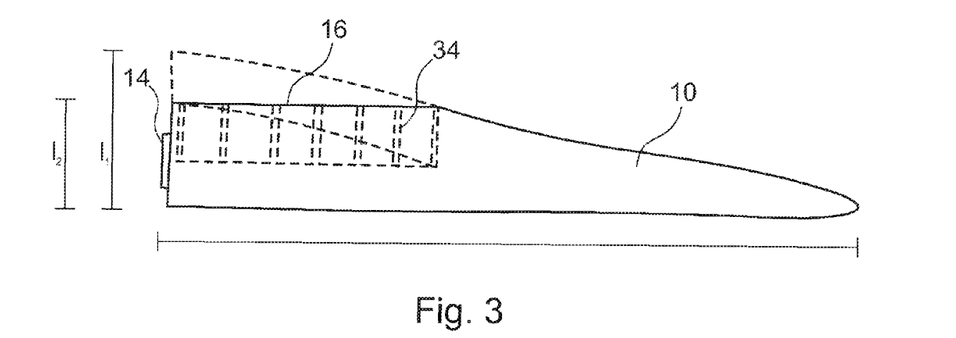
FIG. 3 shows a top view of the rotor blade being a first embodiment of the invention.

FIG. 3 shows a top view of the rotor blade of FIGS. 1 and 2, with like reference numbers indicating like parts as in the previous figures. Herein, the extension flap 20 is seen to be provided at a portion 16 of the main blade section, which has an essentially straight edge. The straight edge extends substantially in a radial direction of the blade. The portion 16 is located at a trailing edge portion of the main blade section 10.

As can be seen in FIG. 3, maximum chord length of the rotor blade (airfoil) can be varied by moving the extension flap between the deployed position and the retracted position. Namely, the maximum chord length is $l_2$ when the extension flap is in the retracted position, and is $l_1$ when the extension flap is in the deployed position. Consequently, a relatively large chord length h can be achieved during use of the blade, while the chord length $l_2$ can be made smaller than $l_1$ if this is necessary or convenient.

For example, during transportation, the extension flap 20 may be retracted e.g. to meet maximum transportation height requirement, which may apply e.g. for road and sea shipping. This facilitates transport without the need for reassembling a blade from several parts after transportation. Typical height regulations are a limitation of the transportation height to about 4.2 meters. Therefore, in embodiments $l_2$ is smaller than 4.2 meters, while $l_1$ is larger than 4.2 meters.

In embodiments, the extension flap 20 or an airfoil lifting surface has a length in a chord direction of the blade that is more than a tenth, or even more than 30%, 50%, or even 80% of the maximum chord length of the main section. Said length may be more than 10 centimeters, or more than 50 or even 100 centimeters.

In embodiments, the variable dimension of the airfoil lifting surface is the maximum chord length of the airfoil, and the maximum chord length is variable by more than 10 centimeters, by more than 50 centimeters, or even by more than 100 centimeters. It may be variable by more than a fifth of a maximum chord length of the main section.

In embodiments, the extension flap 20 is fully retractable, i.e. no portion of the retracted extension flap 20 extends, in a chord direction, beyond the main blade section 10.

In embodiments, there is further provided a pull-back or retraction system to retract the deployed extension flap towards the main blade section e.g. in case of emergency, such as an extreme wind gust event. Thereby, the dimension of the airfoil lifting surface can be decreased, and the load reduced. The pull-back system may be adapted to work in the case of loss of electrical power, such as a local network grid loss and/or a black-out trip. This can be achieved e.g. by a battery powered electrical drive or by a mechanical drive such as a spring loaded system. The spring loaded system has one or more pre-tensioned springs (e.g. one spring on each side of the extension flap 20), possibly with at least one air or oil stroke damper for progressive actuation. The pull-back system may be provided in addition to the actuation system. In the case of a mechanical pull-back system, the springs may be pre-tensioned by the actuation system, e.g. when the extension flap is moved to the deployed position. The pull-back system may even be activated, e.g. by a relais or similar circuit, in any case of absence of electrical power.

In embodiments, the rotor is comprised in a wind turbine (not shown), which further comprises a wind data sensing system with sensors e.g. for wind speed, wind direction, etc. The wind data sensing system may receive the wind data e.g. from motional data of the rotor or from dedicated wind sensors. In some embodiments, the wind turbine further has a blade pitch driving mechanism for adjusting the pitch angle of the rotor blade. These parts and their general functions are described in the "Wind energy handbook" by T. Burton et al. A wire for transmitting power or sensor signals can be fitted from the hub in the center of the blade root with a cable holder to prevent the risk to go into pitch system gear race.

The wind turbine may further comprise a controller for controlling the pitch driving mechanism in response to wind data received from the wind data sensing system. The blade pitch determines the lift from the main blade section 10. The controller is further adapted for controlling the actuation mechanism for the translational motion of the extension flap in response to the wind data, typically independently from the pitch drive.

The controller is adapted for performing the following steps: collecting wind data or data pertaining to the rotor motion; translationally moving, in response to the collected data, the extension flap relative to the main blade section, thereby varying a dimension of the airfoil lifting surface of the rotor blade in response to the collected wind data. The controller may further be equipped with a blade pitch and extension flap excursion driving systems control algorithm.

In embodiments, the controller is adapted for controlling the actuator 30 of the extension flap and the pitch drive according to the following algorithm: At low wind speed, the blade extension flap is deployed, thus increasing blade lift, in particular inboard (root) lift, and thus increasing the torque. Further, at low and also at medium wind speed, the pitch is adjusted according to a determined optimum blade angle of attack, while providing some reserve to maximum lift breakup. At higher wind speed, the extension flap is partially or fully retracted, thus reducing the airfoil lift area and drag due to the extension flap and consequently reducing loads. Thereby, high aerodynamic efficiency, dynamic load reduction and reduced noise emissions may be achieved.

Figure 7:
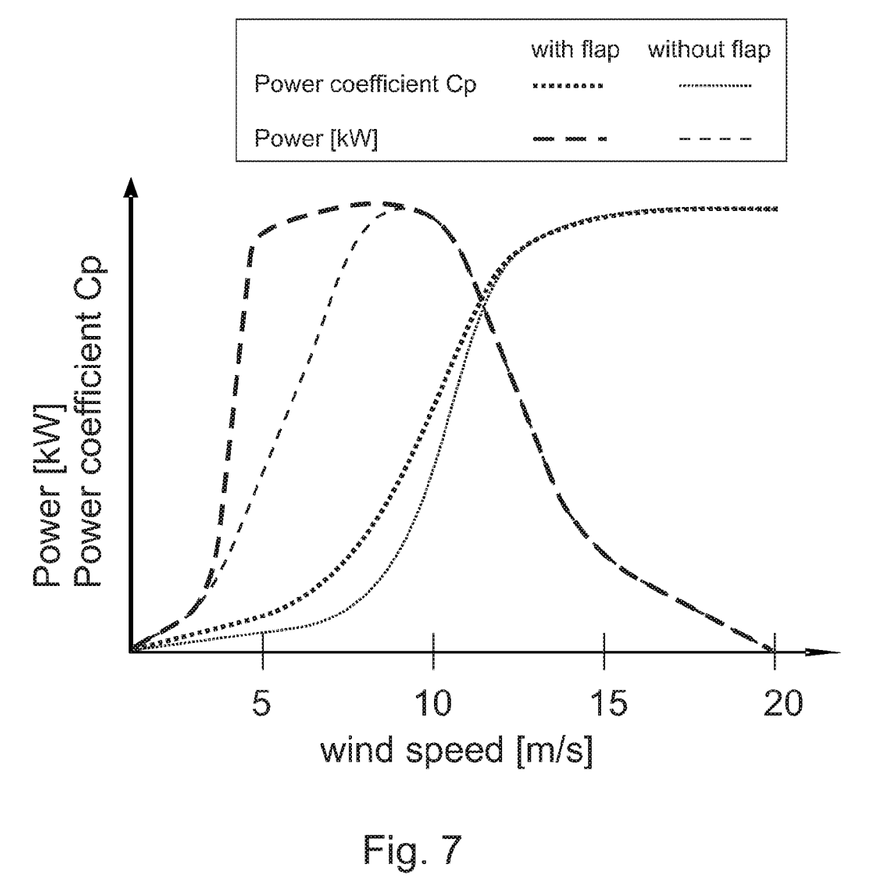
FIG. 7 is a graph showing an extended energy capture of an embodiment of the invention especially at lower wind speed.

FIG. 7 is a graph showing the extended energy capture at lower wind speed that is possible using the above algorithm. The graph shows, qualitatively, the result of calculations that were performed using an airfoil shape that substantially corresponds to the one shown in FIGS. 1-3. Herein, the power (thick dashed line) and the power coefficient Cp (thick dotted line) is drawn as a function of the wind speed (horizontal axis). In FIG. 7, it is assumed that the algorithm of the controller controls the extension flap to be fully deployed for wind speeds smaller than about 7 m/s, and to be fully retracted for wind speeds greater than about 7 m/s. Further, for reference, the power and power coefficient of the blade without extension flap, i.e. only of the main blade section (thin dashed and dotted lines, respectively) is shown.

Figure 4:
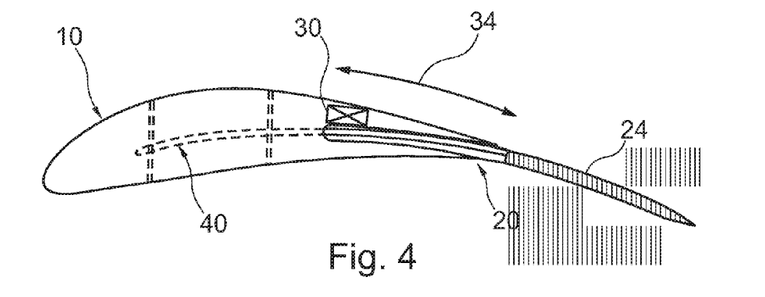
FIG. 4 shows a further cross-sectional side view of the rotor blade being similar to the first embodiment of the invention.

It can be seen that due to the deployed extension flap, Cp is increased at wind speed near 5 m/s with almost a constant efficiency from 5 to 10 m/s. Thus, the optimum aerodynamic efficiency domain is extended to lower wind speeds due to the variable geometry. The large increase of added lift, typically 20 to 40% from the blade root section, generally results in an increase of the generated torque (and thus of the power coefficient) by an amount of 10 to 20% at least for some wind speeds FIG. 4 shows a further cross-sectional side view of a rotor blade similar to that of FIGS. 1-3, with like reference numbers indicating like parts as in the previous figures. Herein, in contrast to FIG. 2, the extension flap has a curvature that matches approximately the curvature of the camber line of the main blade section airfoil. The extension flap 20 is shown in the deployed position. The internal part of the extension flap 20 is shown in solid white color, and the external part is shown as shaded.

FIG. 5 shows a cross-sectional side view of a rotor blade being a further embodiment of the invention, with like reference numbers indicating like parts as in the previous figures. In the rotor blade of FIG. 5, the extension flap 20 is provided outside of the main blade section 10 both in the deployed position (shown) and in the retracted position (not shown). Thus, the extension flap 20 is retractable to a retracted position at an outer surface of the main blade section. Further, the main blade section has a recessed area for receiving the extension flap in the retracted position at its trailing edge side (on the suction side). The recessed area is outside the main blade section. The extension flap 20 is slidable partially or fully in and out of the recessed area.

The extension flap motion is guided by a telescopic guide system 42 comprising at least one retractable telescopic bar or element. It is, further, be actuated e.g. by motorised sliding trim guides. The extension flap 20 and optionally the recessed cavity can be provided on the suction side as shown, but also on the pressure side outer surface of the main blade section.

The curvature of the extension flap 20 matches approximately with the curvature of the corresponding surface of the main blade section 10. Consequently, the extension flap 20 can be moved along the surface with only little disturbance of the overall surface shape. This reduces additional drag due to the extension flap 20 and simplifies actuation by the driving mechanism 30. In embodiments, the cross-section of the external blade side that is adjacent to the main blade section is shaped as a circular segment.

FIG. 6 shows a cross-sectional side view of the rotor blade being a third embodiment of the invention, with like reference numbers indicating like parts as in the previous figures. Therein, the extensional flap 20 is adapted for moving translationally from the retracted to the deployed position by a pivotable guiding system. The retracted position is within a recessed cavity located at a central portion of the main blade section. It may be on the pressure side (as shown) or on the suction side of the main blade section (not shown).

For guiding the movement, the pivotable guiding system comprises two pivotable bars or elements 44. Each of the elements 44 is attached, with a joint at its first end, to the main blade section, and with a further joint at its second end, to the extension flap. The movement of the extension flap between the retracted and the deployed position is further illustrated by the arrows 34, and by the extension flap 21 and the pivotable elements 45 shown as dashed lines in an intermediate position. The motion is translational, because after the movement substantially all parts of the extension flap 20 have changed position in a similar direction. The motion can be actuated e.g. by motorised pivoting trim guides.

Further variations of the rotor blade are possible. For example, instead of a single extension flap 20, the extension flap may be partitioned. Instead of being provided at or being retractable or deployable to a position at a trailing edge side of the rotor, one or more of these positions may be at a leading edge side of the rotor. Further, although the extension flap was shown to be located at a root portion of the blade, in further embodiments the extension flap may be located at other radial portions or over the entire radial blade span.

Further, in addition to being translationally moveable, the extension flap may be pitched relative to the main blade section. In this case, the rotor blade comprises a corresponding hinge connection that allows the relative pitching or rotational/pivotal motion. It further comprises a relative pitch driving mechanism for adjusting the pitch of the extension flap relative to the main blade section. In this case, the above-mentioned controller is further adapted for controlling the relative pitch driving mechanism in response to received wind data.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. For example, the actuation system and the guiding system on the one hand may be combined with any guiding system e.g. for retraction of the extension flap inside or outside (on the pressure side or suction side) of the main blade section. The patentable scope of the invention is defined by the claims, and may include other examples that occur to those skilled in the art. Such other examples are intended to be within the scope of claims of they have structural elements that do not differ from the literal language of the claims, or if they include equivalent structural elements with insubstantial differences from the literal languages of the claims.

What is claimed is:

1. A rotor blade for a wind turbine, the rotor blade comprising:
    a main blade section comprising a trailing edge side and a root end;
    an extension flap provided at the root end of the trailing edge side of the main blade section and movable relative to the main blade section along a chord direction of the rotor blade; and
    wherein a length of the extension flap is less than one-half of a length of the main blade section.

2. The rotor blade of claim 1, wherein the extension flap is movable relative to the main blade section in the chord direction between a retracted position and a deployed position.

3. The rotor blade of claim 2, wherein the trailing edge side of the main blade section comprises a portion having a substantially straight edge in a span wide direction, and wherein the extension flap is provided at the portion having the substantially straight edge.

4. The rotor blade of claim 2, wherein the extension flap has a chord length that is more than a tenth of a maximum chord length of the main blade section.

5. The rotor blade of claim 2, wherein the rotor blade has a maximum chord length that is variable by more than a fifth of a maximum chord length of the main blade section.

6. The rotor blade of claim 2, wherein a maximum chord length of the rotor blade is less than about 4.2 meters when the extension flap is in the retraced position, and wherein the maximum chord length is more than about 4.2 meters when the extension flap is in the deployed position.

7. The rotor blade of claim 2, further comprising a driving mechanism for moving the extension flap relative to the main blade section in the chord direction.

8. The rotor blade of to claim 7, wherein the driving mechanism comprises a retraction system that is adapted for retracting the extension flap towards the main blade section.

9. The rotor blade of claim 2, wherein the extension flap has a curvature that matches approximately a curvature associated with the main blade section.

10. The rotor blade of to claim 9, wherein the curvature matches approximately a curvature of a camber line of the main blade section, or matches approximately a curvature of one of a pressure side surface and a suction side surface of the main blade section.

11. The rotor blade of claim 2, wherein the extension flap is slidable relative to the main blade section in the chord direction.

12. The rotor blade of claim 11, wherein the main blade section comprises a sliding guide for guiding the extension flap.

13. The rotor blade of claim 12, wherein the sliding guide is formed for allowing a sliding motion of the extension flap substantially along a curved external surface of the main blade section.

14. The rotor blade of claim 2, wherein the extension flap is at least partially retractable inside the main blade section.

15. The rotor blade of to claim 2, wherein in the retracted position the extension flap is retractable to an external surface of the main blade section.

16. The rotor blade of claim 1, wherein the extension flap is connected to the main blade section by at least one pivot linkage.

17. The rotor blade of claim 9, wherein an upper surface of the extension flap substantially lies on a same plane of an upper surface of the main blade section.

18. The rotor blade of claim 1, wherein a trailing edge of the extension flap aligns with a trailing edge of the main blade section.

19. A wind turbine comprising:
    a rotor blade comprising:
        a main blade section comprising a trailing edge side and a root end;
        an extension flap provided at the root end of the trailing edge side of the main blade section and movable relative to the main blade section along a chord direction of the rotor blade; and
        wherein a length of the extension flap is less than one-half of a length of the main blade section.

20. The wind turbine according to claim 19, further comprising:
    a first driving mechanism for moving the extension flap relative to the main blade section in the chord direction; and
    a second driving mechanism for adjusting a pitch angle of the rotor blade.

21. The wind turbine according to claim 20, further comprising:
    a wind data sensing system; and
    a controller adapted for controlling the first driving mechanism and the second driving mechanism in response to wind data received from the wind data sensing system.

22. A method of controlling a wind turbine having at least one rotor blade, the method comprising:
    collecting wind data;
    moving, in response to the collected wind data, an extension flap of the at least one rotor blade of the wind turbine relative to a main blade section of the at least one rotor blade along a chord direction of the at least one rotor blade, the extension flap being connected to the main blade section along a root end of a trailing edge side of the main blade section, thereby varying a dimension of an airfoil lifting surface of the at least one rotor blade in response to the collected wind data; and wherein a length of the extension flap is less than one-half of a length of the main blade section.

* * * * *

UNITED STATES PATENT AND TRADEMARK OFFICE
CERTIFICATE OF CORRECTION

| | | |
|---|---|---|
| PATENT NO. | : 7,828,523 B2 | Page 1 of 1 |
| APPLICATION NO. | : 11/691587 | |
| DATED | : November 9, 2010 | |
| INVENTOR(S) | : Bonnet | |

It is certified that error appears in the above-identified patent and that said Letters Patent is hereby corrected as shown below:

In Column 4, Line 28, delete "h" and insert -- 11 --, therefor.

In Column 7, Line 29, after "scope of", insert -- the --.

In Column 8, Line 1, in Claim 8, after "blade of", delete "to".

In Column 8, Line 7, in Claim 10, after "blade of", delete "to".

In Column 8, Line 24, in Claim 35, after "blade of", delete "to".

Signed and Sealed this
Eighth Day of March, 2011

David J. Kappos
*Director of the United States Patent and Trademark Office*